US009580079B2

(12) United States Patent
Long

(10) Patent No.: US 9,580,079 B2
(45) Date of Patent: Feb. 28, 2017

(54) DYNAMIC DRIVING RANGE MAPS FOR IMPROVING DRIVING RANGE ANXIETY

(71) Applicant: Mary Long, Mountain View, CA (US)

(72) Inventor: Mary Long, Mountain View, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/922,150

(22) Filed: Jun. 19, 2013

(65) Prior Publication Data

US 2014/0379183 A1    Dec. 25, 2014

(51) Int. Cl.
     *B60W 40/12*      (2012.01)
     *B60L 11/18*      (2006.01)
     *G01C 21/36*      (2006.01)
     *B60W 50/14*      (2012.01)
     *B60L 15/00*      (2006.01)

(52) U.S. Cl.
CPC .......... *B60W 40/12* (2013.01); *B60L 11/1824* (2013.01); *B60L 11/1838* (2013.01); *B60L 11/1846* (2013.01); *B60L 11/1861* (2013.01); *B60L 15/00* (2013.01); *B60W 50/14* (2013.01); *G01C 21/3697* (2013.01); *B60L 2240/62* (2013.01); *B60L 2240/64* (2013.01); *B60L 2240/66* (2013.01); *B60L 2240/68* (2013.01); *B60L 2240/72* (2013.01); *B60L 2240/80* (2013.01); *B60W 2050/146* (2013.01); *B60W 2510/244* (2013.01); *B60W 2520/10* (2013.01); *B60W 2550/12* (2013.01); *B60W 2550/402* (2013.01); *Y02T 10/645* (2013.01); *Y02T 10/7005* (2013.01); *Y02T 10/705* (2013.01); *Y02T 10/7044* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/161* (2013.01); *Y02T 90/162* (2013.01); *Y02T 90/163* (2013.01); *Y02T 90/169* (2013.01); *Y04S 30/14* (2013.01)

(58) Field of Classification Search
CPC ... B60W 40/12; B60W 50/14; B60L 11/1824; G01C 21/3697
See application file for complete search history.

(56) References Cited

U.S. PATENT DOCUMENTS

| 8,370,020 | B2 | 2/2013 | Bauman et al. |
|---|---|---|---|
| 8,433,455 | B2 | 4/2013 | Siy et al. |
| 8,458,315 | B2 | 6/2013 | Miche et al. |
| 8,688,364 | B2 | 4/2014 | Lange |
| 8,725,306 | B2 | 5/2014 | Ramezani et al. |
| 2006/0212194 | A1 | 9/2006 | Breed |
| 2011/0234427 | A1 | 9/2011 | Ingram et al. |
| 2012/0109413 | A1 | 5/2012 | Smith et al. |
| 2013/0073113 | A1 | 3/2013 | Wang et al. |

(Continued)

*Primary Examiner* — Basil T Jos
(74) *Attorney, Agent, or Firm* — Mintz Levin Cohn Ferris Glovsky and Popeo, P.C.

(57) ABSTRACT

The systems, methods and articles described herein are directed to a cloud based server which can access and retrieve data for dynamically calculating and generating information relating to driving ranges of one or more electric vehicles. In addition, the information relating to the driving ranges can be displayed on the one or more electric vehicles for improving driving range anxiety. Related apparatus, systems, techniques and articles are also described.

20 Claims, 4 Drawing Sheets

(56) References Cited

U.S. PATENT DOCUMENTS

| | | |
|---|---|---|
| 2013/0173097 A1 | 7/2013 | Jotanovic |
| 2013/0179061 A1* | 7/2013 | Gadh et al. .................. 701/123 |
| 2013/0282227 A1 | 10/2013 | Chen et al. |
| 2013/0282472 A1 | 10/2013 | Penilla et al. |
| 2013/0339108 A1 | 12/2013 | Ryder et al. |
| 2014/0026088 A1 | 1/2014 | Monte |
| 2014/0032102 A1* | 1/2014 | Egoshi ............... G01C 21/3469 <br> 701/454 |
| 2014/0129047 A1 | 5/2014 | Barrett |
| 2014/0172285 A1* | 6/2014 | Kuhn et al. .................. 701/123 |

\* cited by examiner

DYNAMIC DRIVING RANGE MAPS FOR IMPROVING DRIVING RANGE ANXIETY

TECHNICAL FIELD

The subject matter described herein relates to accessing and retrieving data for dynamically calculating and generating information relating to driving ranges of one or more electric vehicles. In addition, the information relating to the driving ranges can be displayed to drivers of the one or more electric vehicles for improving driving range anxiety.

BACKGROUND

Some drivers of battery electric vehicles can experience range anxiety, or driving range anxiety, due to a number of issues. Driving range anxiety can be described as the fear that a vehicle has insufficient range to reach its destination and would thus strand the vehicle's occupants. Driving range anxiety can be used in reference to battery electric vehicles, also referred to herein as electric vehicles, and may be considered one of the major barriers to large scale adoption of vehicles which are solely powered by batteries. For example, a driver can experience driving range anxiety while driving an electric vehicle because of their shorter driving ranges compared to gas-fueled cars, fewer charging stations than gas stations, and long charging times.

When some electric vehicles are fully charged, the distance the electric vehicle can travel until requiring re-charging is typically 80 to 100 miles. Therefore, assuming all other conditions being equal (i.e., road conditions, driving conditions, etc.) a fully charged electric vehicle cannot go as far as a gas-fueled car with a full tank of gas. For at least some drivers, when a gas-fueled car has only about a quarter of a tank of gas the driver begins to be concerned about re-fueling in order to not run out of gas. Therefore, it can be particularly unnerving for drivers who are used to gas-fueled cars to drive electric vehicles due to the limited driving range of the electric vehicle.

In addition to the limited driving range compared to gas-fueled cars, there can be significantly less charging stations available for re-charging electric vehicles compared to gas stations for re-fueling gas-fueled cars. Therefore, not only are some drivers concerned about the limited driving range of electric vehicles compared to gas-fueled cars, they can also be concerned about the availability of charging stations for re-charging their electric vehicles.

Furthermore, it can take upwards of several hours to re-charge an electric vehicle which can be significantly inconvenient for a driver. Therefore, due to a potentially long re-charging time, a driver of an electric vehicle can experience driving range anxiety if the driver is not provided with reliable information regarding the electric vehicle's ability to reach one or more driving destinations.

At least some electric vehicles provide the driver with a variety of information, such as approximate charge level of the battery and approximate driving range before re-charging of the electric vehicle is required. However, even this type of information can result in driving range anxiety if the information provided is unreliable. For example, at least some electric vehicles provide an approximate driving range before re-charging is required, but the information is based off of only past and current driving and car conditions and does not factor in a variety of other factors which affect the driving range. Therefore, a driver can be informed that the electric vehicle has enough battery charge to reach a destination and then shortly after, such as due to a change in driving conditions, can inform the driver that there is not enough battery charge to reach the destination. A variety of factors can affect the driving range of an electric vehicle, such as traffic, type of driving terrain (i.e., inclines, declines, road conditions, etc.), and the driving habits of the driver.

SUMMARY

In one aspect, data is continually received and/or accessed that identifies one or more conditions affecting a driving range of a vehicle powered by at least one battery. Thereafter, it is dynamically calculated, based on the received or accessed data, driving range information for the vehicle characterizing a distance the vehicle can travel until the at least one battery is depleted. Based on this dynamically calculated driving range information, a display is generated in a graphical user interface that characterizes the driving range information for the vehicle. The display is then updated based on changes in the data identifying the one or more conditions affecting the driving range of the vehicle.

The data can comprise at least one of a current vehicle characteristic, route information, route history, and a driver history. The current vehicle characteristic can comprise one or more of a battery charge, location of the vehicle, car component activity, and battery condition. The route information can comprise one or more of a current traffic condition, upcoming traffic condition along a defined route, current vehicle speed, and current weather along the defined route. The display can comprise one or more of a geographical area, a defined route, a point of interest, a current location indicator, a charging station, and at least one accessibility range. The display can comprise one or more accessibility ranges having characteristics defining probabilities of the vehicle accessing the one or more accessibility ranges. The accessibility ranges can be color coded or otherwise visually distinct to characterize the accessibility of the accessibility ranges relative to a current location of the vehicle.

The display can comprise at least one charging station displayed either along or near a defined route. The charging stations can comprise a characteristic which indicates the accessibility of the charging stations relative to a current location of the vehicle. The vehicle can wirelessly communicates with a cloud based server that dynamically calculates in at least near real-time information characterizing driving range information for the vehicle which is displayed on the display.

Computer program products are also described that comprise non-transitory computer readable media storing instructions, which when executed one or more data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages, including a system which can assist in improving driving range anxiety for electric vehicle drivers by providing driving range information with improved reliability and accuracy.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

These and other aspects will now be described in detail with reference to the following drawings.

Like reference symbols in the various drawings indicate like elements.

DETAILED DESCRIPTION

This document describes systems, methods and articles that can improve driving range anxiety for drivers of electric vehicles. The system, methods and articles described herein can improve driving range anxiety by providing drivers with driving range information with improved reliability and accuracy, including providing at least one display which characterizes driving range information, such as either a driving range accessibility map or a charging station accessibility map.

Figure 1:
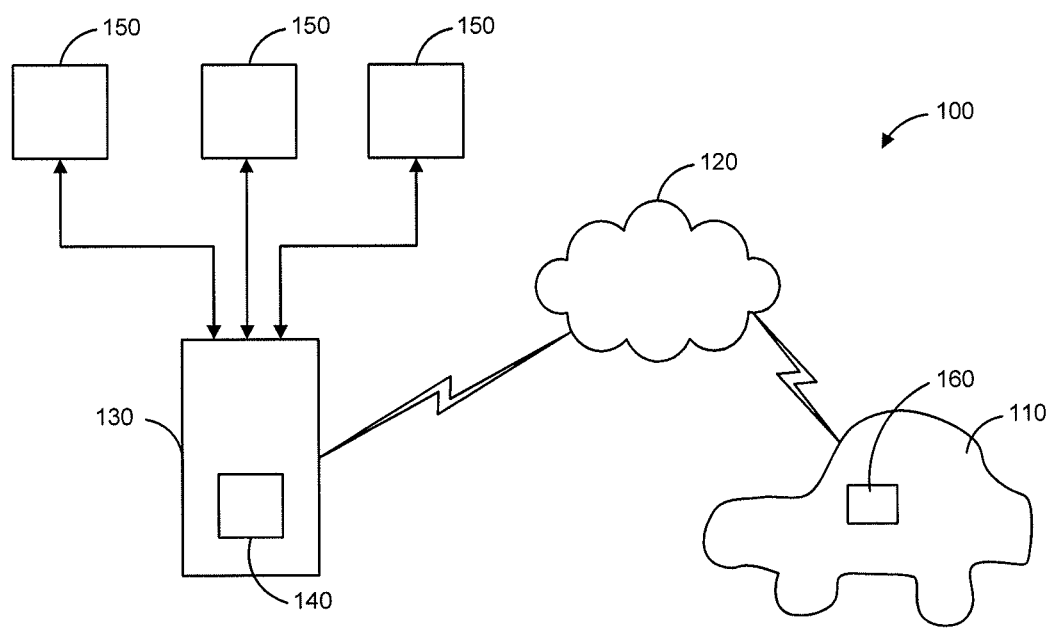
FIG. 1 shows a process flow diagram illustrating a system for relieving driving range anxiety.

FIG. 1 shows a process flow diagram illustrating a variation of the system 100 and methods for relieving driving range anxiety of a driver of an electric vehicle. The system 100 can include at least one electric vehicle 110 which is in communication with a network 120, including wireless communication with the network 120. The network 120 can be in communication, including wirelessly, with a cloud based server 130 which can include a memory and at least one data processor. In addition, the cloud based server 130 can collect and retrieve data from one or more external sources 150, such as a variety of electric vehicles, traffic monitoring stations, and weather stations. The one or more external sources 150 can assist the cloud based server 130 with providing drivers of the one or more electric vehicles with reliable information characterizing the driving range of their electric vehicle, including in real-time or near real-time. This reliable information can be provided on a display 160 which can be viewable by the driver, including while driving, and can improve driving range anxiety of the drivers.

The electric vehicles 110 can include a subscriber identity module (SIM) card which can allow the electric vehicles to connect to the internet, including the network 120. Once connected to the internet, the electric vehicle 110 can send and receive information from the cloud based server 130. The cloud based server 130 can continually collect a variety of data from the one or more electric vehicles in communication with the cloud based server 130, in addition to data from the one or more external sources 150, which can assist the cloud based server 130 in dynamically calculating and generating in at least near-real time reliable driving range information. This driving range information can then be sent to the one or more electric vehicles and presented to the driver in a variety of ways, including displaying the information on, for example, a graphical user interface in the electric vehicle, including the display 160, on a cell phone or computer.

The variety of data which can be collected by the cloud based server 130 from the electric vehicles can include one or more of a vehicle location, battery charge consumption, car component usage (i.e., air conditioning, car lights, or any vehicle component which can affect the battery charge), type of electric vehicle (i.e., year, make and model), type and condition of battery, traffic conditions, driving habits of driver, and any other factor which can affect the battery charge of the electric vehicle. In addition, the location of the electric vehicle when the information is retrieved or sent from the electric vehicle is stored along with the data. This can allow the cloud based server 130 to have a complex data matrix including locations of electric vehicles and factors relating to their battery charge and battery charge consumption. This matrix of data can be compiled and stored into a route history database within the cloud based server 130.

The data comprising the route history database can be continually updated and can be used by the cloud based server 130 for dynamically calculating and generating battery charge and driving range information in at least near real-time for a variety of electric vehicles. For example, the cloud based server 130 can use data collected along a particular driving route to assist in determining battery charge consumption along that particular driving route. Therefore, the continually updated data in the route history database can assist the cloud based server 130 to calculate the amount of battery consumption required to drive along the particular driving route, which can be used to generate driving range information for one or more electric vehicles driving along that particular driving route.

In some variations, the cloud based server 130 can include a mileage module 140 which can continually receive and access data which can be used to dynamically calculate and generate driving range information relating to a specific electric vehicle 110, as shown in FIG. 1. This electric vehicle 110 can be configured to at least receive information from the cloud based server 130 or mileage module 140 which can provide the electric vehicle 110 with continually updated driving range information in real-time or near real-time. The continually updated driving range information can be provided to a driver of the electric vehicle 110 in a variety of ways, such as displaying the information (e.g., a dynamic heat map, etc.) on a graphical user interface which can be viewed by the driver, including while driving.

The mileage module 140 can receive and access data relating to one or more characteristics specific to the electric vehicle 110, including a current status of one or more features of the electric vehicle 110, for generating driving range information. For example, the electric vehicle 110 can send information to the mileage module 140 relating to the battery charge, the type and condition of the battery, and usage of vehicle components (i.e., air conditioning, car lights, or any vehicle component which affects the battery charge).

In addition, data relating to a driving route can be sent to the mileage module 140 for assisting in determining the driving range of the electric vehicle 110. For example, the driver can input a defined driving route or destination into a user interface of the electric car, such as a global positioning system (GPS), which can be sent to the mileage module 140. Based on the driving route information, additional information can be retrieved or sent to the mileage module 140 from at least one of the electric vehicle 110, the cloud based server 130, or a variety of external sources 150 having information about the driving route which can be used to generate reliable driving range information for the electric vehicle 110. The additional information can include the current location of the electric vehicle 110 along the driving route, traffic along the driving route, current speed of the electric vehicle along the driving route, and weather conditions along the driving route. For example, this information can be sent to the cloud based server 130 from a variety of external sources 150, including from weather monitoring stations, traffic reports, highway patrol, etc. The driving route information and additional information relating to the driving route can be continually sent to the mileage module 140 in order to dynamically calculate and generate reliable information relating to the driving range of the electric vehicle 110, including in at least near-real time.

In some variations, the cloud computing system 130 can also include a driver history database which can compile data relating to driving habits of one or more drivers. In addition, the driver history database can configure a driver history profile for each driver that uses or is in communication with the system 100. Each driver history profile can be compiled of data relating to a variety of driving habit characteristics of the driver which can be accessible to at least the mileage module 140. The data relating to the driving habit characteristics can include, for example, how fast the driver accelerates from a complete stop, whether and for how long the driver coasts, such as while approaching a traffic light or stop sign, how often the driver drives in excess of the speed limit, and how aggressive the driver drives the electric vehicle.

The mileage module 140 can retrieve and access the variety of information either stored on the cloud computing system 140, including information from the route history database and the driver history profile, or provided by the electric vehicle 110 and external sources 150 in order to dynamically calculate and generate reliable information relating to the driving range of the electric vehicle 110. In addition, the system 100 can generate one or more displays characterizing the driving range information of the electric vehicle 110.

Figure 2:
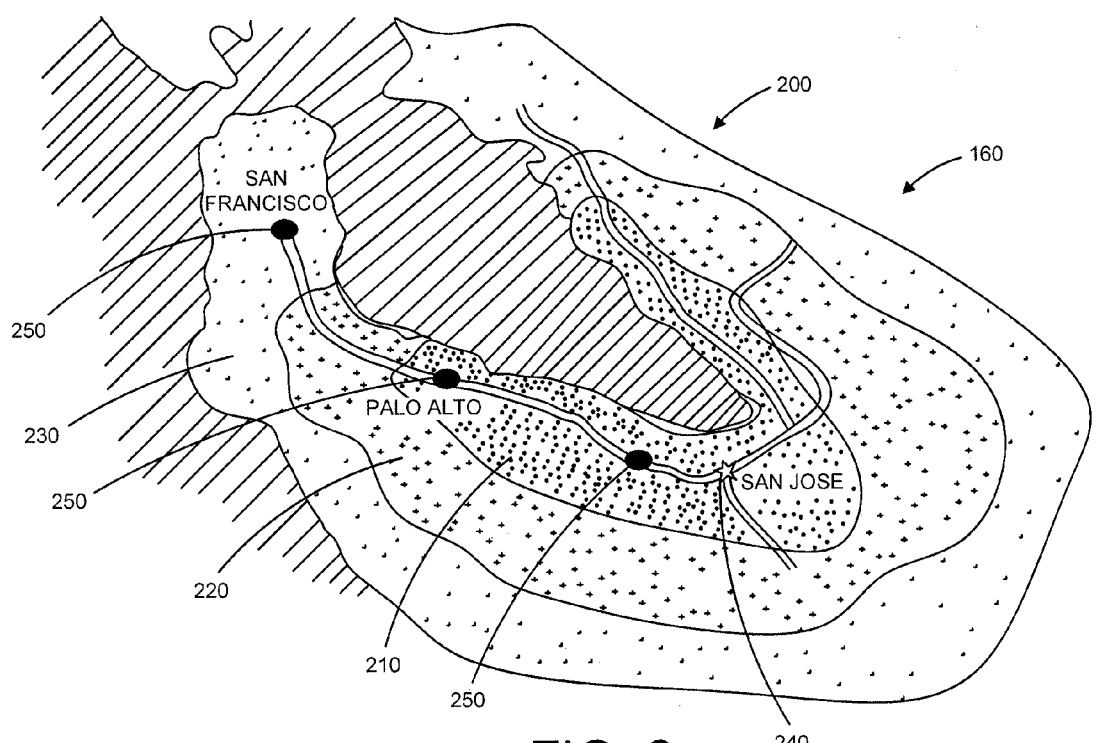
FIG. 2 illustrates a display provided by the system which characterizes driving range information for the electric vehicle in the form of a driving range accessibility map.

FIG. 2 illustrates an example of a display 160 which can be displayed on a graphical user interface, such as in an electric vehicle 110, on a cell phone or on a computer. The display 160 can include a variety of information relating to the driving range of the electric vehicle 110 which can improve driving range anxiety of the driver of the electric vehicle. As shown in FIG. 2, the display 160 can include a driving range accessibility map 200 which can include one or more ranges of accessibility over a geographical area. For example, the driving range accessibility map 200 can include at least three ranges of accessibility with each range defining a different level of accessibility.

The ranges shown in FIG. 2 include a low range 230, medium range 220, and high range 210 of accessibility. For example, the low range 230 can indicate a zero to low probability that the electric vehicle can access the area indicated as being the low range 230. The low range 230 area can be defined based on the information provided to the mileage module 140, including the current location of the electric vehicle which can also be identified on the display 160, such as the current location indicator 240 shown in FIG. 2. In addition, the medium range 220 and high range 210 can indicate a medium probability and high probability, respectively, that the electric vehicle can access these areas based the information provided to the mileage module 140.

The accessibility ranges can provide an intuitive interpretation of the information being provided by the mileage module 140 and can be updated and presented on the display 160 in at least near real-time. In some variations, each accessibility range (i.e., low range 230, medium range 220 and high range 210) can be color coded or include a pattern which can easily distinguish the different accessibility ranges. For example, the low range 230 can be color coded red, the medium range 220 can be color coded yellow and the high range 210 can be colored green, such as similar to a heat map. This color arrangement can allow a driver to view the display 160 and quickly determine whether one or more points of interest 250 fall within one or more accessibility ranges. Therefore, the display 160 can provide a driver with a quick and easy determination of what destinations the driver can reach.

As shown in FIG. 2, at least one point of interest 250 is shown in the display 160. The points of interest 250 can be entered by the user, such as entered into a GPS of the electric vehicle, which can then be displayed on the display 160. In addition, the user-selected or preferred route, including routes to the one or more points of interest 250, can be displayed on the display 160. In some variations, as part of the navigation, various offers can be displayed to a user on the display that are associated with a point of interest 250 and/or near a charging station.

Additionally, the current location indicator 240 and accessibility ranges can also be displayed on the display 160. Therefore, the driver can view the display 160 and easily determine whether one or more points of interest 250 are accessible given the information provided to the mileage module 140. As discussed above, the mileage module 140 is continually updated with information and can calculate and generate driving range information in at least real-time. This allows the mileage module 140 to dynamically update the driving range accessibility map 200, including the accessibility ranges, including in at least real-time.

Figure 3:
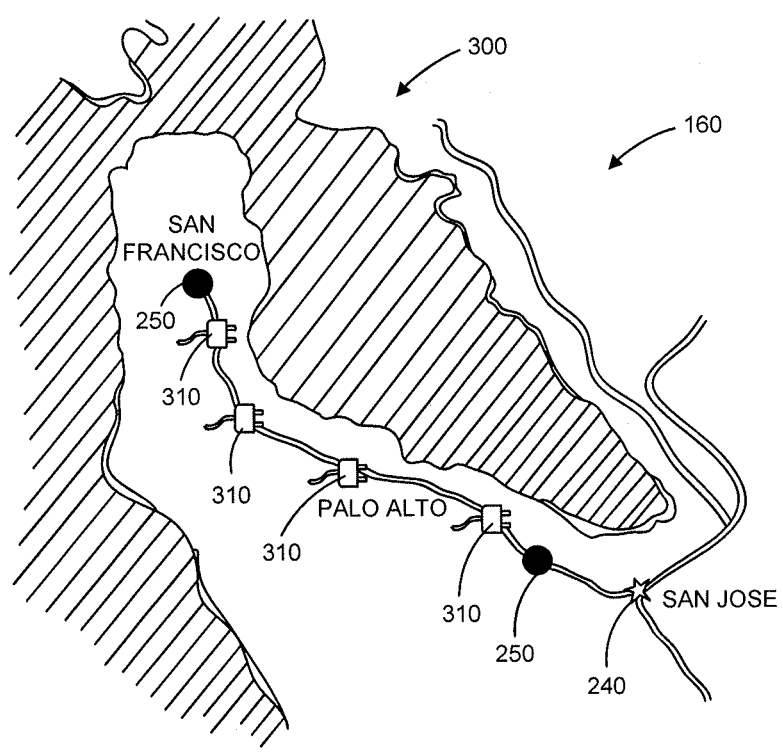
FIG. 3 illustrates a display provided by the system which characterizes driving range information for the electric vehicle in the form of a charging station accessibility map.

FIG. 3 illustrates another example of a display 160 which can be displayed on a graphical user interface viewable by the driver of the electric vehicle 110 and improve driving range anxiety. As shown in FIG. 3, the display 160 can include a charging station accessibility map 300 which can include one or more charging stations 310 located in a geographical area. For example, the charging station accessibility map 300 can indicate different levels of accessibility to each charging station 310 relative to the current location of the electric vehicle 110. The current location of the electric vehicle 110 can also be shown in the display, such as the current location indicator 240 shown in FIG. 3.

The one or more charging stations 310 shown in the display 160 can include every charging station within the geographic area shown in the display 160, or only the charging stations 310 located along, or near, a defined driving route or points of interest 250. Each charging station 310 can be color coded or otherwise easily differentiated based upon their level of accessibility. For example, and similar to the accessibility ranges described above, charging stations 310 which have a high probability of being reached by the electric vehicle can be color coded green. Additionally, charging stations which have a medium probability and low probability of being reached by the electric vehicle can be color coded yellow and red, respectively. It will be appreciated that other color coding/grayscale arrangements can also be utilized. This arrangement can allow a driver to view the charging station accessibility map 300 and quickly determine whether one or more charging stations 310 are accessible.

A variety of displays 160 can be configured using the information dynamically calculated and generated by the mileage module 140. In addition, the display 160 can show more than one configuration, such as having a split screen or providing the ability for the driver to select a particular display configuration. For example, the driver can select to view either the charging station accessibility map 300 or the driving range accessibility map 200 to display on the graphical user interface.

The display 160 can be dynamically updated, including the ranges of accessibility, accessibility of the charging stations 310 and current location indicator 240, due to the mileage module 140 continually being updated with information, as discussed above and including in at least near real-time. Therefore, the display 160 can provide the driver with reliable driving range information based on the current location of the driver and a variety of factors, including present and upcoming driving conditions, current electric vehicle conditions, driver history and route history information, such as described above.

One example method of the system 100 includes an electric vehicle having a driver with the electric vehicle s in wireless communication with the cloud based server 130. The driver can input a destination and determine a preferred route which can be saved, such as on a GPS system of the electric vehicle. The saved preferred route to the destination can be sent to the mileage module 140. Additional data can be retrieved or sent to the mileage module 140, including data relating to the driver (i.e., from a driver history profile of the driver), route information (i.e., from the route history database), and current conditions of the electric vehicle (i.e., battery charge, vehicle component usage, battery condition, type of electric vehicle, etc.). Information related to the preferred route can also be sent to the mileage module 140, including type of roads, traffic along the route, weather conditions along the route, etc.

The mileage module 140 can use this information to compute driving range information which can be displayed to the driver, such as in the form of a driving range accessibility map 200 or a charging station accessibility map 300. In addition, the mileage module 140 can be continually updated with information in order to dynamically display updated information related to the driving range of the electric vehicle. In this way, the driver can be provided with reliable driving range information which can improve the driving range anxiety of the driver. This can also allow the driver to plan appropriate stops for charging the vehicle, if necessary, prior to running out of battery charge. Therefore, with this system 100, the driver can determine whether the electric vehicle can reach at least one destination without requiring re-charging. In addition, the system can allow the driver to determine where a most convenient charging station for the vehicle may be, such as along a preferred route, without having a concern about running out of battery charge before reaching the charging station. In some variations, charging stations can be taken into account when finding an optimal route for the vehicle. For example, if charging station 310 in Palo Alto only has level 1 and 2 charging, but the driver wants level 3 charging (which is more rapid than levels 1 and 2), the navigation routing can include the level 3 charging station on the route. In addition or alternatively, the user can set preferences saying that he or she is always notified of certain types of charging stations (e.g., level 3 charging stations) when they are within 5 miles of the vehicle (or the planned route).

Figure 4:
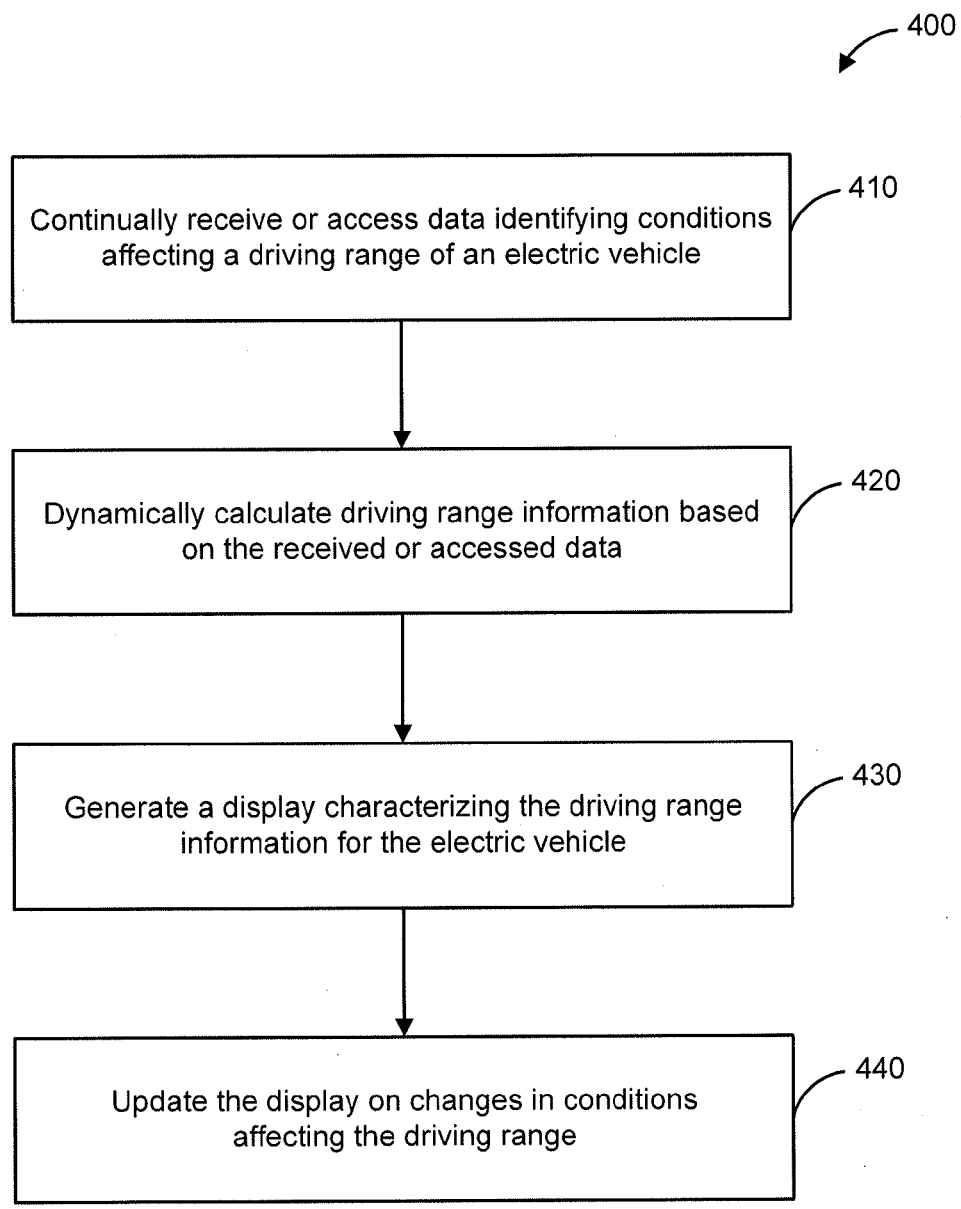
FIG. 4 illustrates a process flow diagram illustrating a method of dynamically generating displays for relieving driving range anxiety.

FIG. 4 illustrates a process flow diagram 400 illustrating a method of dynamically generating displays, including in at least near real-time, for relieving driving range anxiety in which, at 410, the cloud based server 130 continually receives and accesses data identifying conditions affecting a driving range of an electric vehicle. Thereafter, at 420, the cloud based server 130 or mileage module 140 dynamically calculate driving range information based on the received or accessed data. The cloud based server 130 or mileage module 140 then, at 430, generates a display 160 characterizing the driving range information for the electric vehicle. Thereafter, at 440, the cloud based server 130 or mileage module 140 update the display based on changes in conditions affecting the driving range. The display can be viewed by a driver of the electric vehicle which can assist in improving, or relieving, driving range anxiety of the driver.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such backend, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. For example, the current subject matter can be applied to other situations for vehicles of all types including hybrids and gasoline powered vehicles. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A non-transitory computer program product storing instructions, which, when executed by at least one data processor, causes the at least one processor to perform operations comprising:
   continually receiving or accessing data identifying one or more conditions affecting a driving range of a vehicle powered by at least one battery;
   dynamically calculating, based on the received or accessed data, driving range information for the vehicle characterizing a distance the vehicle can travel until the at least one battery is depleted;
   generating, based on the dynamically calculated driving range information, a display in a graphical user interface characterizing the driving range information for the vehicle, wherein the display comprises a first accessibility range defining a first area having a first probability of the vehicle accessing the first area a second accessibility range defining a second area having a second probability of the vehicle accessing the second area, and a third accessibility range defining a third area having a third probability of the vehicle accessing the third area, wherein the first probability is lower than the second probability, and wherein the second probability is lower than the third probability; and
   updating the display based on changes in the data identifying the one or more conditions affecting the driving range of the vehicle.

2. The computer program product of claim 1, wherein the data comprises at least one of a current vehicle characteristic, route information, route history, and a driver history.

3. The computer program product of claim 2, wherein the current vehicle characteristic comprises one or more of a battery charge, location of the vehicle, car component activity, and battery condition.

4. The computer program product of claim 2, wherein the route information comprises one or more of a current traffic condition, upcoming traffic condition along a defined route, current vehicle speed, current weather along the defined route.

5. The computer program product of claim 1, wherein the display comprises one or more of a geographical area, a defined route, a point of interest, a current location indicator, and a charging station.

6. The computer program product of claim 1, wherein the first accessibility range is color coded with a first color characterizing the first probability of the vehicle accessing the first area, wherein the second accessibility range is color coded with a second color characterizing the second probability of the vehicle accessing the second area, and wherein the third accessibility range is color coded with a third color characterizing the third probability of the vehicle accessing the third area.

7. The computer program product of claim 1, wherein the display comprises at least one charging station displayed either along or near a defined route.

8. The computer program product of claim 7, wherein the charging stations comprise a characteristic which indicates the accessibility of the charging stations relative to a current location of the vehicle.

9. The computer program product of claim 1, wherein the vehicle wirelessly communicates with a cloud based server which dynamically calculates in at least near real-time information characterizing driving range information for the vehicle which is displayed on the display.

10. The computer program product of claim 1, wherein the dynamically calculating comprises:
   accessing a route history database to dynamically calculate and generate battery charge and driving range information in at least near real-time for the vehicle, the route history database comprising a matrix of locations of electric vehicles and factors relating to their battery charge and battery charge consumption at particular locations.

11. A computer implemented method comprising:
   continually receiving or accessing data identifying one or more conditions affecting a driving range of a vehicle powered by at least one battery;
   dynamically calculating, based on the received or accessed data, driving range information for the vehicle characterizing a distance the vehicle can travel until the at least one battery is depleted;

generating, based on the dynamically calculated driving range information, a display in a graphical user interface characterizing the driving range information for the vehicle, wherein the display comprises a first accessibility range defining a first area having a first probability of the vehicle accessing the first area, a second accessibility range defining a second area having a second probability of the vehicle accessing the second area, and a third accessibility range defining a third area having a third probability of the vehicle accessing the third area, wherein the first probability is lower than the second probability, and wherein the second probability is lower than the third probability; and updating the display based on changes in the data identifying the one or more conditions affecting the driving range of the vehicle.

12. The computer implemented method of claim 11, wherein the data comprises at least one of a current vehicle characteristic, route information, route history, and a driver history.

13. The computer implemented method of claim 12, wherein the current vehicle characteristic comprises one or more of a battery charge, location of the vehicle, car component activity, and battery condition.

14. The computer implemented method of claim 12, wherein the route information comprises one or more of a current traffic condition, upcoming traffic condition along a defined route, current vehicle speed, current weather along the defined route.

15. The computer implemented method of claim 11, wherein the display comprises one or more of a geographical area, a defined route, a point of interest, a current location indicator, and a charging station.

16. The computer implemented method of claim 11, wherein the first accessibility range is color coded with a first color characterizing the first probability of the vehicle accessing the first area, wherein the second accessibility range is color coded with a second color characterizing the second probability of the vehicle accessing the second area, and wherein the third accessibility range is color coded with a third color characterizing the third probability of the vehicle accessing the third area.

17. The computer implemented method of claim 11, wherein the display comprises at least one charging station displayed either along or near a defined route.

18. The computer implemented method of claim 17, wherein:

the charging stations comprise a characteristic which indicates the accessibility of the charging stations relative to a current location of the vehicle;

the vehicle wirelessly communicates with a cloud based server which dynamically calculates in at least near real-time information characterizing driving range information for the vehicle which is then displayed on the display.

19. The computer implemented method of claim 11, wherein the dynamically calculating comprises:

accessing a route history database to dynamically calculate and generate battery charge and driving range information in at least near real-time for the vehicle, the route history database comprising a matrix of locations of electric vehicles and factors relating to their battery charge and battery charge consumption at particular locations.

20. A system comprising:

an electric vehicle powered by at least one battery;

a cloud based server comprising memory and at least one data processor which continually retrieves and accesses data identifying one or more conditions affecting a driving range of at least the electric vehicle, the cloud based server implementing a mileage module which retrieves data from the cloud based computing module and dynamically calculates and generates driving range information for the electric vehicle, the mileage module having wireless communication with the electric vehicle for sending driving range information to the electric vehicle; and a display viewable by the driver of the electric vehicle showing one or more configurations of the driving range information, wherein the display comprises a first accessibility range defining a first area having a first probability of the vehicle accessing the first area, a second accessibility range defining a second area having a second probability of the vehicle accessing the second area, and a third accessibility range defining a third area having a third probability of the vehicle accessing the third area, wherein the first probability is lower than the second probability, and wherein the second probability is lower than the third probability.

* * * * *